(12) United States Patent
Montgomery

(10) Patent No.: US 12,595,027 B1
(45) Date of Patent: Apr. 7, 2026

(54) CAMERA MOUNT FOR A SURFBOARD

(71) Applicant: John Robert Montgomery, Honolulu, HI (US)

(72) Inventor: John Robert Montgomery, Honolulu, HI (US)

( * ) Notice: Subject to any disclaimer, the term of this patent is extended or adjusted under 35 U.S.C. 154(b) by 80 days.

(21) Appl. No.: 18/424,049

(22) Filed: Jan. 26, 2024

Related U.S. Application Data

(63) Continuation-in-part of application No. 16/539,934, filed on Aug. 13, 2019, now Pat. No. 12,216,390.

(51) Int. Cl.
  B63B 32/70    (2020.01)
  G03B 17/56    (2021.01)
(52) U.S. Cl.
  CPC ............ B63B 32/70 (2020.02); G03B 17/561 (2013.01)
(58) Field of Classification Search
  None
  See application file for complete search history.

(56) References Cited

U.S. PATENT DOCUMENTS

| | | | | |
|---|---|---|---|---|
| 8,567,744 B1 * | 10/2013 | Marn | ................... | F16M 11/041 |
| | | | | 248/548 |
| 9,229,299 B1 * | 1/2016 | Morlon | ................. | F16M 13/04 |
| 9,268,201 B1 * | 2/2016 | Montgomery | ......... | G03B 29/00 |
| 2019/0031302 A1 * | 1/2019 | Nutz | ....................... | B63B 34/26 |
| 2022/0057696 A1 * | 2/2022 | Ramos | ................... | G03B 17/08 |
| 2022/0060209 A1 * | 2/2022 | Balogun | ............... | F16M 11/18 |

* cited by examiner

*Primary Examiner* — Rodney E Fuller

(57) ABSTRACT

A breakaway camera mount assembly usable with a surfboard may include a base affixed to the surfboard, and a detachable segment mechanically and detachably connected to the base and configured to separate from the base upon application of a separation force thereto; where the base includes a base attachment having an orifice defined therein, and recesses defined in the orifice; and where the detachable segment includes beams at an end thereof, each beam including a protrusion extending radially outward at an end of that beam, wherein each beam engages a corresponding recess to detachably connect the detachable segment to the base; where the detachable segment includes a camera stick.

7 Claims, 5 Drawing Sheets

CAMERA MOUNT FOR A SURFBOARD

CROSS-REFERENCE TO RELATED APPLICATIONS

This application is a continuation-in-part of U.S. patent application Ser. No. 16/539,934, filed Aug. 13, 2019, which is hereby incorporated by reference herein in its entirety.

FIELD OF THE INVENTION

The invention is directed generally to athletic equipment, and more particularly to accessories for a surfboard.

BACKGROUND

Surfers often enjoy making videos of themselves while surfing great waves, for their own personal memories and to share with others who may not be able to surf, or able to surf at a high level. One way to do this is to mount a camera to a surfboard. Such mounting has two major problems. First, the mount cannot be too rigid. Such a mounting can result in damage to the camera or surfboard in the event that a surfer hits it—whether that surfer is the one on the board or another surfer who collides with the user. Such a mounting can also result in injury to the surfer who hits it. Second, the mount cannot be too loose, or else the camera will fall off and become lost upon even a slight impact.

SUMMARY

A breakaway camera mount system includes a base affixed to a surfboard, and a detachable segment that is configured to detach from the base upon application of a separation force over a selected threshold.

The detachable segment includes a camera stick, which may include a first portion that angles into a second portion. A camera attachment point is joined to the camera stick second portion and configured to receive and securely hold a camera.

In some aspects, a breakaway camera mount assembly usable with a surfboard may include a base affixed to the surfboard, and a detachable segment mechanically and detachably connected to the base and configured to separate from the base upon application of a separation force thereto; where the base includes a base attachment having an orifice defined therein, and recesses defined in the orifice; and where the detachable segment includes beams at an end thereof, each beam including a protrusion extending radially outward at an end of that beam, wherein each beam engages a corresponding recess to detachably connect said detachable segment to the base; where the detachable segment includes a camera stick.

In some aspects, the base attachment may include notches defined therein, where the beams are first insertable through the notches, after which the beams are rotatable substantially a quarter turn into engagement with the base attachment.

BRIEF DESCRIPTION OF THE DRAWINGS

The detailed description of some embodiments of the invention is made below with reference to the accompanying figures, wherein like numerals represent corresponding parts of the figures.

DETAILED DESCRIPTION

Figure 1:
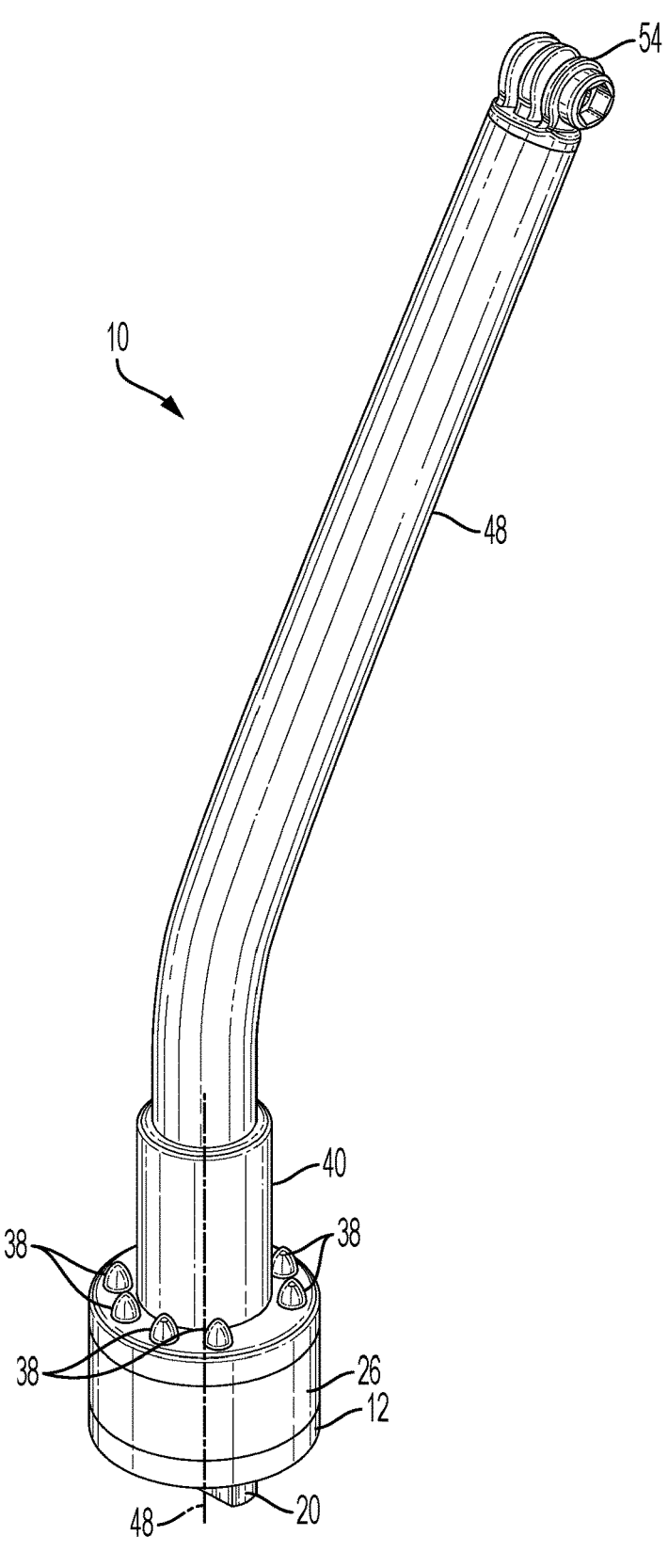
FIG. 1 is a perspective view of one embodiment of the present invention.
Figure 2:
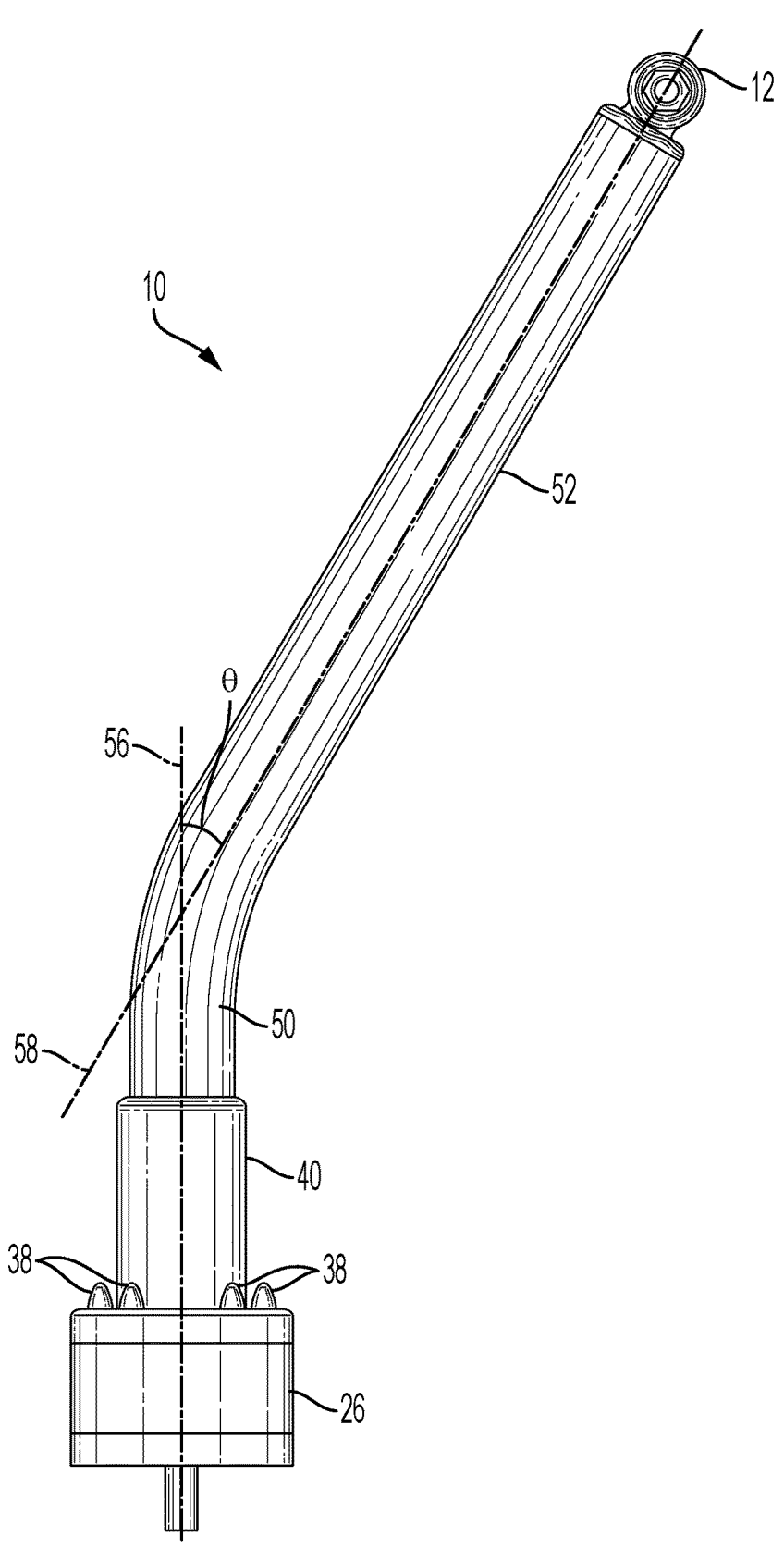
FIG. 2 is a side view of one embodiment of the present invention.
Figure 3:
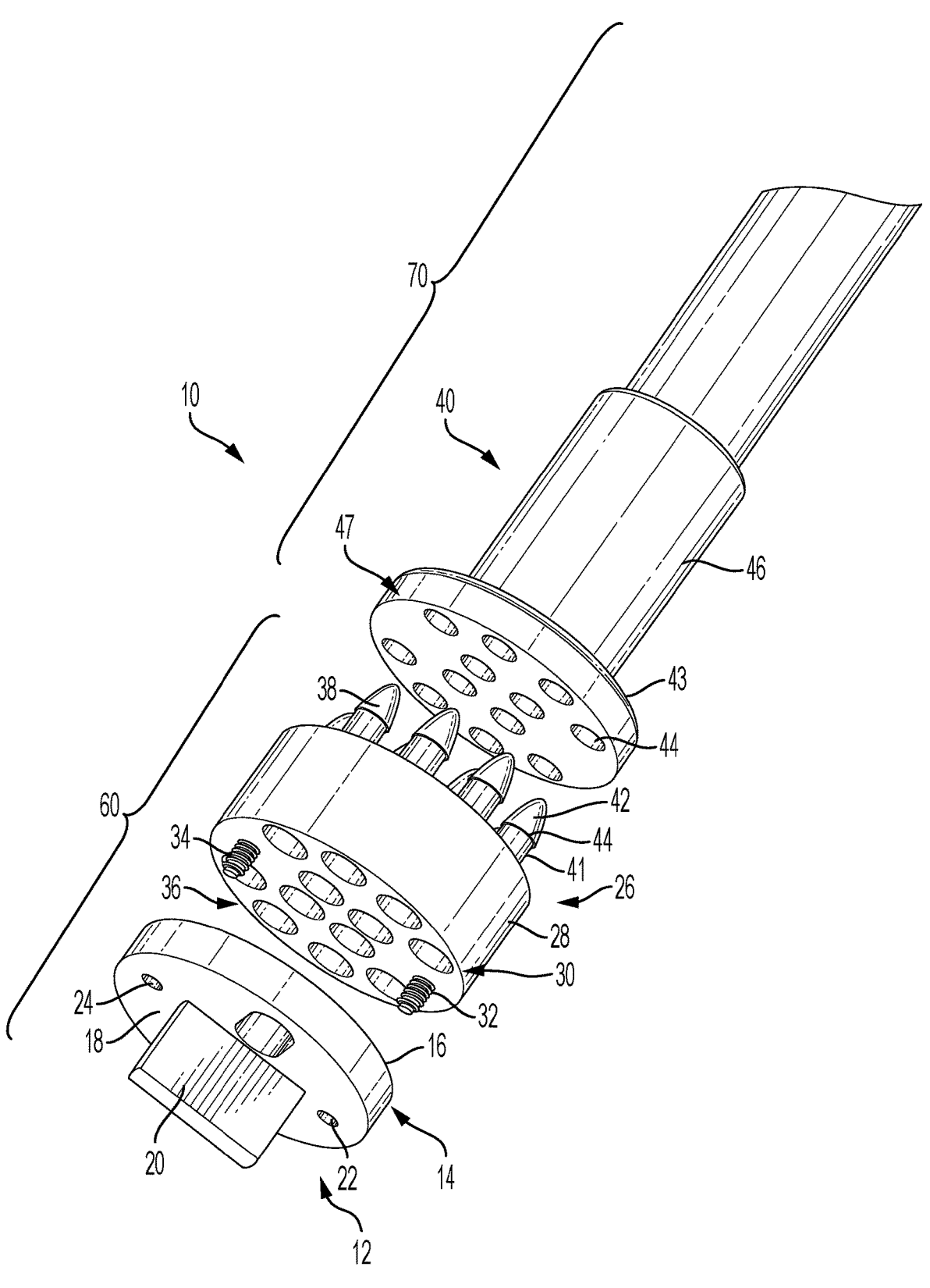
FIG. 3 is an assembly view of one embodiment of the present invention.
Figure 4:
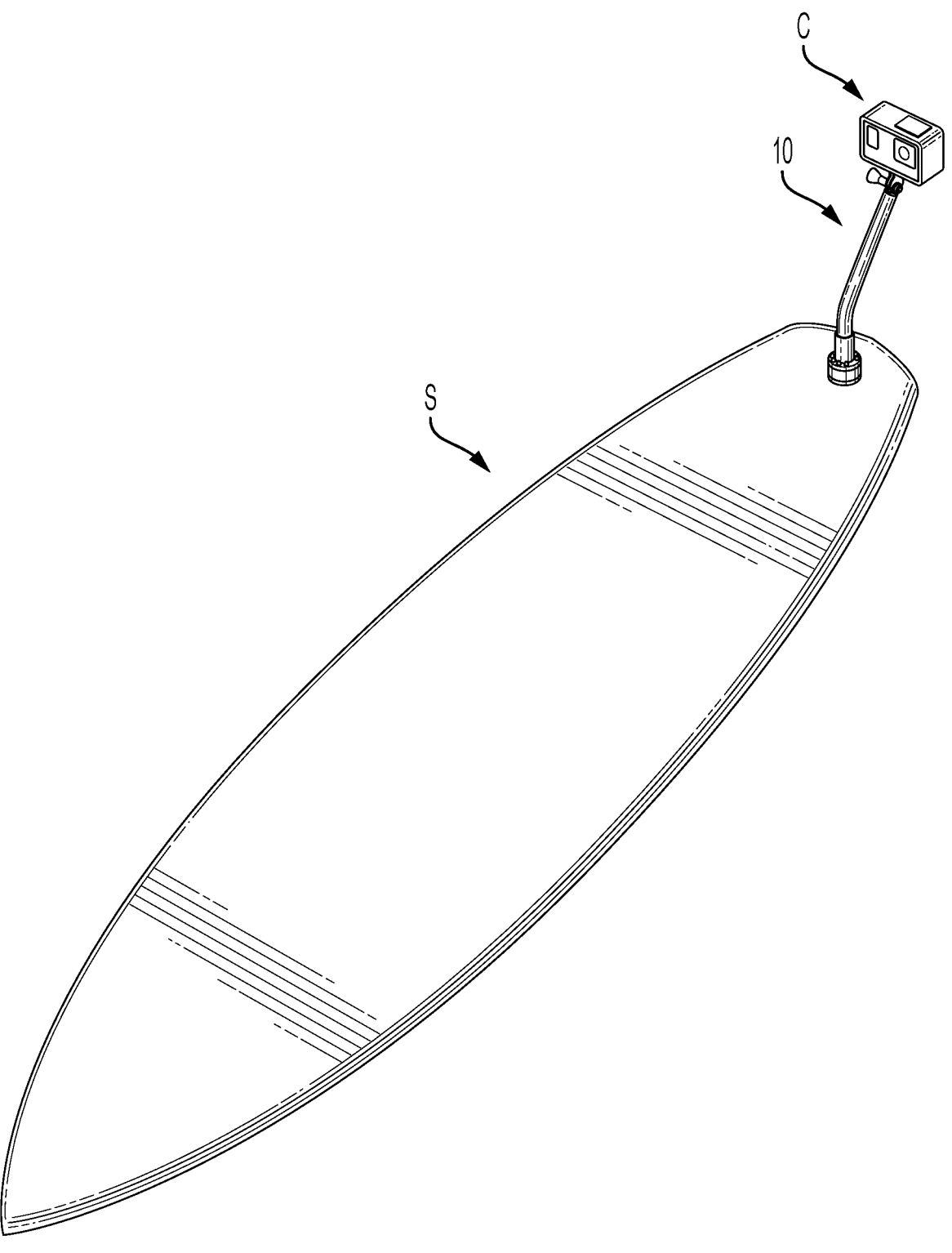
FIG. 4 is a perspective view of one embodiment of the present invention shown in use.

Referring to FIGS. 1-4, one embodiment of a breakaway camera mount assembly 10 includes a base element 12 and base attachment 26 (collectively, the base 60) affixed to the surfboard S, and a detachable segment 70 that is configured to detach from the base 60 upon application of a separation force that reaches or exceeds a selected threshold.

The base element 12 is affixed to the surfboard S, and may extend into the body of the surfboard S. The surfboard S may include a corresponding receiver that receives the base element 12. According to some embodiments, the base element 12 may include a base plug cylindrical portion 14 having a base plug cylindrical portion top portion 16 and a base plug cylindrical portion bottom portion 18. A rectangular coupling 20 is joined to the base plug cylindrical portion bottom portion 18 and further joined into a rectangular slot on the surfboard S. A first threaded opening 22 and a second threaded opening 24 traverse the base plug cylindrical portion 14 from the base plug cylindrical portion top portion 16 to the base plug cylindrical portion bottom portion 18. In some embodiments, the surfboard S has a fin control system (FCS) plug, and the base element 12 may be a plastic cylinder with a rectangular coupling that fits into the FCS plug in the surfboard. The base element 12 can be tightened into place relative to the surfboard S using a small screw that affixes the base element 12 to the surfboard S. The surfboard S need not have an FCS plug in order to be usable with the breakaway camera mount assembly 10; the base element 12 may be affixed to the surfboard S in any other suitable manner, such as by threading on the base element 12 itself and corresponding threading on a receiver in the surfboard S, by adhesive, or by any other suitable means. In this way, a user can utilize the breakaway camera mount assembly 10 with a surfboard S without an FCS plug. Further, if the user is utilizing an FCS plug in the surfboard S for other purposes, the user may still utilize the breakaway camera mount assembly 10 with that surfboard S.

A base attachment 26 may include a base attachment cylindrical portion 28 having a plurality of base attachment cylindrical portion openings 30. A first threaded member 32 and a second threaded member 34 extend through a base attachment cylindrical portion bottom side 36, corresponding to the first threaded opening 22 and the second threaded opening 24. The threaded members 34, 36 thus can be screwed into the threaded openings 22, 24. A plurality of pins 38 extend upward from the base plug cylindrical portion top portion 16 and extend through the plurality of base attachment cylindrical portion openings 30. According to some embodiments, the base element 12 and base attachment 26 may be a single component, rather than two separate components that are secured together.

Each pin 38 may include a pin cylindrical shaft 41 joined to a pin bullnose 42. A pin bullnose lower edge 44 has a larger radius then the pin cylindrical shaft 41.

In some embodiments, each pin 38 is composed of attachment cylindrical portion openings 30, each pin bullnose lower edge 44 is compressed through the plurality of base attachment cylindrical portion openings 30. Then, each pin bullnose 42 expands past the corresponding cylindrical portion opening 30.

The detachable segment 70 includes a post 40 at a lower end thereof. The post 40 may include a flange 47. The flange 47 includes a plurality of flange openings 44 defined therethrough, aligned with the plurality of base attachment cylindrical portion openings 30, and joined to the plurality of pins 38. A post cylinder 46 is attached to the flange 47 and extends upward from the flange 47 along a post cylinder central axis 48.

The connection between the detachable segment 70 and the base attachment releases at a separation force. That separation force depends largely on the contact area between the pin bullnose lower edges 44 and the upper surface 43 of the flange 47. A lateral force applied to the detachable segment 70 pulls an edge of the flange 47 upward away from the base 60. That motion applies a force with an upward component to at least one pin bullnose lower edge 44, at its contact area with the upper surface 43 of the flange 47. At a particular threshold, the pin bullnose 42 is compressed by that force, and slides into the corresponding flange opening 44. This movement reduces the numbers of pins 38 holding the detachable segment 70 in place. The reduction of the number of pins 38 holding the detachable segment 70 in place, while the separation force is still being applied, causes additional pin bullnoses 42 to be compressed and slide into the corresponding flange opening 44, until all of the pins 38 have slid out of the flange openings 44 and the detachable segment 70 has detached from the base 60.

Figure 7:
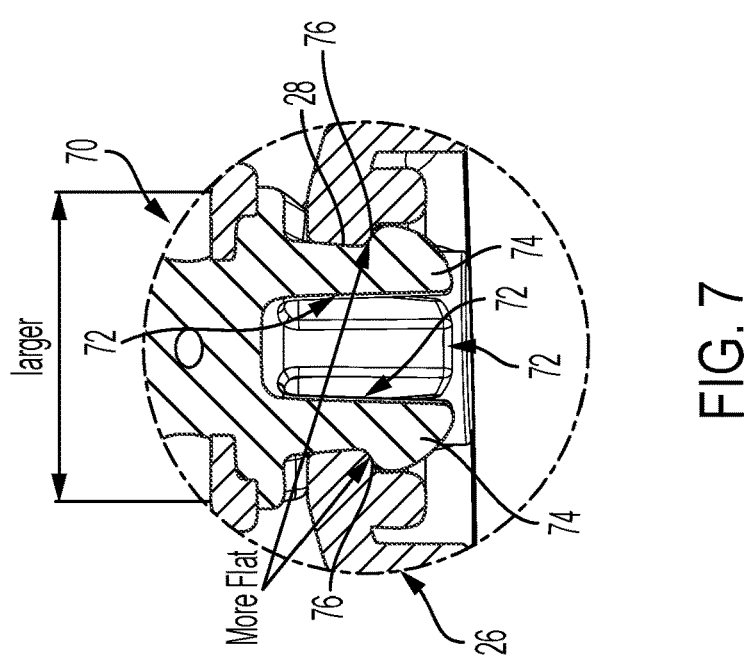
FIG. 7 is a detail view of the side cross-section view of FIG. 6.
Figure 6:
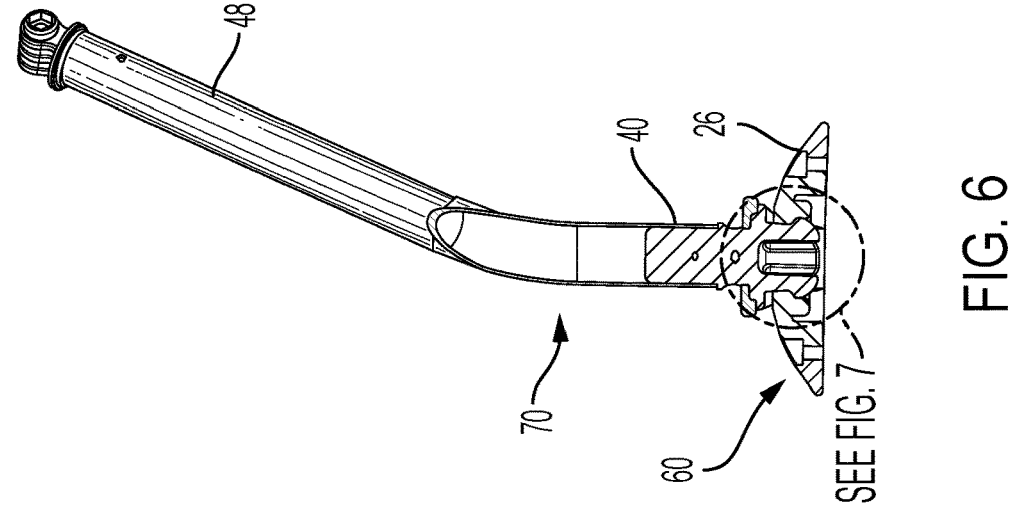
FIG. 6 is a side cross-section view of the embodiment of FIG. 5.
Figure 5:
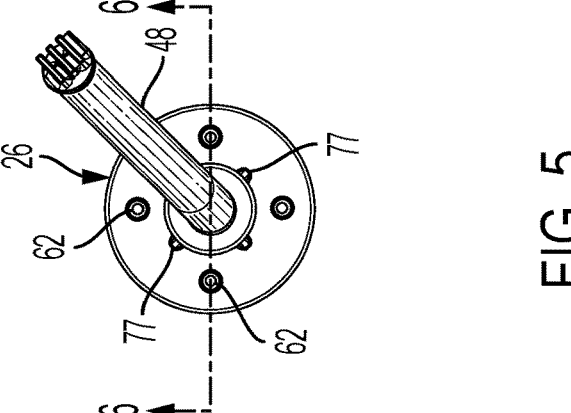
FIG. 5 is a top view of another embodiment of the present invention.

Advanced surfers may surf more aggressively on larger waves, such that the force required to separate the detachable segment 70 from the base 60 is larger than described in the previous embodiment. A base element 12 may be affixed to the surfboard S, as described above with regard to FIGS. 1-4. Referring also to FIGS. 5-7, the base attachment 26 of another embodiment of the may have an upper external surface that is substantially a spherical cap (i.e., a portion of a sphere or of a ball cut off by a plane). The spherical cap shape minimizes the risk of injury to the surfer if the surfer steps or falls onto the base attachment 26 when the detachable segment 70 is not connected to the base 60. One or more through holes 62 may extend vertically through the base attachment 26, such that screws or other fasteners can be inserted through the through holes 62 into corresponding holes in the base element 12, allowing the base attachment 62 to be secured affixed to the base element 12. Alternately, the base attachment 26 may be affixed to the base element 12 in any other suitable manner. If so, the number of through holes 62 may be reduced, or the through holes 62 may be omitted altogether. The base attachment 26 includes an orifice 28 defined therethrough.

The detachable segment 70 is configured to snap-fit detachably into the base attachment 26. The detachable segment 70 may include a plurality of beams 72 at or near the bottom of the detachable segment 70. In one embodiment, four beams 72 are utilized, each spaced circumferentially substantially 90 degrees apart from the adjacent beams 72. Each beam 72 may be tapered vertically in the downward direction. At the end of each beam 72, a protrusion 74 extends radially outward. FIGS. 6-7 show a cross-section of the beams 72 snap-fit into the base attachment 26. The protrusions 74 each engage a matching recess 76 defined in the base attachment 26.

According to some embodiments, the orifice 28 in the base attachment 26 includes four notches 77 at four locations spaced circumferentially substantially 90 degrees apart from one another. In such an embodiment, the beams 72 of the detachable segment 70 may be inserted into the base attachment 26 along the corresponding notches 77 in the orifice 28, after which the detachable segment 70 is rotated substantially 90 degrees (that is, substantially a quarter turn) to lock the detachable segment 70 into place. In this way, the beams 72 may be inserted into the orifice 28 without the need to deflect them as much as would be required to dislodge the beams 72 by force during breakaway, or without the need to deflect them at all, making it easier to insert the detachable segment 70 into the base 60, and reducing or eliminating stress on the beams 72 during insertion of the detachable segment 70 into the base 60. According to other embodiments, the notches 77 are not present in the base attachment 26, and the detachable segment 70 may be inserted into the orifice 28 by simply grasping the detachable segment 70 and pressing the beams 72 into the orifice 28 along the longitudinal centerline of the orifice 28, deflecting the beams 72 inward until the protrusions 74 move into the corresponding recesses 76, allowing the beams 72 to snap back to their undeflected state.

The connection between the detachable segment 70 and the base attachment releases at a separation force. The separation force depends, in part, on the angle of the contact surface between each protrusion 72 and the corresponding recess 76. A lateral force applied to the detachable segment 70 pushes at least one of the beams 72 into contact with an upper edge of the orifice 28, deflecting it inward toward the longitudinal centerline of the orifice 28. That movement of at least one of the beams 72 disengages the protrusion 72 of each of those beams 72 from the corresponding recess 76, reducing the number of protrusions 72 (and the number of beams 72) engaged with the base attachment 26 and thereby reducing the force holding the detachable segment 70 from the base 60. This reduction in holding force, while the separation force is still being applied, causes the detachable segment 70 to detach from the base 60.

The separation force required to detach the detachable segment 70 from the base 60 is less than the force required to break the surfboard S. According to some embodiments, the force required to detach the detachable segment 70 from the base 60 is less than 30% of the force required to break the surfboard S. According to other embodiment, the force required to detach the detachable segment 70 from the base 60 is less than 25%, 20%, 15%, 10% or 5% of the force required to break the surfboard S. In this way, the surfboard S is protected from damage, and the body of the surfer that encounters the detachable segment 70 and applies separation force thereto is protected from physical injury.

Optionally, some or all of the base 60 and/or detachable segment 70 may be fabricated from any material or combination of materials, including ferromagnetic material such as steel. However, the connection between the base 60 and the detachable segment 70 is a mechanical connection, not a magnetic connection. Neither the base 60 nor the detachable segment 70 utilize magnetism to engage, hold or otherwise connect with one another. As used in this document, the phrases "mechanical connection" and "mechanically connected" are defined to mean a connection between elements that is mechanical, and does not utilize magnetism to connect those elements. For example, the base 60 and/or detachable segment 70 may be fabricated from plastic or other material that does not and cannot be magnetized, with no change in the engagement between the base 60 and the detachable segment 70.

The detachable segment 70 includes a camera stick 48 joined to the post 40. The camera stick 48 may include a camera stick first portion 50 that angles into a camera stick second portion 52. In some embodiments, the camera stick 48 is affixed to the post 40, such as by adhesive or welding. In some embodiments, the camera stick 48 is integral with the post 40. A camera attachment point 54 is joined to the camera stick second portion 52 and configured to accommodate a camera C. The camera stick first portion 50 further is approximately cylindrical and comprises a camera stick first portion central axis 56. The camera stick second portion 52 further is approximately cylindrical and comprises a camera stick second portion central axis 58. A camera stick angle θ is measured clockwise from the camera stick first portion central axis 56 to the camera stick second portion central axis 58. The camera stick angle is at least 10 degrees but no more than 60 degrees. Preferably, the camera angle can be about 30 degrees. Advantageously, the camera stick 48 and/or other component of the detachable segment 70 is buoyant, so that the detachable segment 70 and the camera C attached thereto can be easily retrieved after the detachable segment 70 separates from the base 60. In such embodiments, referring also to FIG. 6, the camera stick 48 may be partially or entirely hollow, and the hollow volume may be substantially sealed in order to retain air therein and increase the buoyancy of the camera stick 48. In other embodiments, the detachable segment 70 is connected to a lanyard or other item that is in turn fixed to the base 60 and/or the surfboard S, so that the detachable segment 70 and the camera C attached thereto can be easily retrieved after the detachable segment 70 separates from the base 60.

It will be appreciated that the breakaway camera mount assembly 10 may be utilized on a workpiece other than a surfboard S. The breakaway camera mount assembly 10 may be useful in any application where a camera C is desired to be used, and where the camera C and/or detachable segment 70 may encounter forces that could damage the camera C, detachable segment 70, and/or the workpiece to which the detachable segment 70 is connected if the camera C is affixed to the workpiece. For example, by way of example and not limitation, the workpiece may be a sailboat, a snowboard, one or more skis, an automobile, a kite, a kayak, a canoe, an all-terrain vehicle, a motorcycle, a bicycle, a helmet, or a sled. As other examples and not limitations, the breakaway camera mount assembly 10 may be utilized in commercial/industrial settings rather than recreational settings, where the workpiece may be a forklift, a delivery vehicle, an earth mover, a different vehicle, or a stationary application at a location where contact with the breakaway camera mount assembly 10 is anticipated or unavoidable.

As used in this application, the term "a" or "an" means "at least one" or "one or more." As used in this application, the term "about" or "approximately" refers to a range of values within plus or minus 10% of the specified number. As used in this document, and as customarily used in the art, terms of approximation, including the words "substantially" and "about," are defined to mean normal variations in the dimensions and other properties of finished goods that result from manufacturing tolerances and other manufacturing imprecisions, and the normal variations in the measurement of such dimensions and other properties of finished goods. Any element in a claim that does not explicitly state "means for" performing a specified function, or "step for" performing a specified function, is not to be interpreted as a "means" or "step" clause as specified in 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A breakaway camera mount assembly usable with a workpiece, comprising:

a base affixed to the workpiece; and a detachable segment mechanically and detachably connected to said base and configured to separate from said base upon application of a separation force thereto;

wherein said base comprises a base attachment having an orifice defined therein, and a plurality of recesses defined in said orifice; and wherein said detachable segment comprises a plurality of beams at an end thereof, each beam comprising a protrusion extending radially outward at an end of said beam, wherein each said beam engages a corresponding said recess to detachably connect said detachable segment to said base; and wherein said detachable segment further comprises a camera stick.

2. The breakaway camera mount assembly of claim 1, wherein said detachable segment comprises four said beams, each said spaced circumferentially substantially 90 degrees apart from said beams adjacent thereto.

3. The breakaway camera mount assembly of claim 2, wherein said base attachment further comprises a plurality of notches defined therein, wherein said beams are insertable through said notches after which said beams are rotatable substantially 90 degrees.

4. The breakaway camera mount assembly of claim 1, wherein an upper surface of said base attachment is substantially a spherical cap.

5. The breakaway camera mount assembly of claim 1, wherein each said protrusion snap-fits to a corresponding said recess to connect said base to said detachable segment.

6. A breakaway camera mount assembly usable with a workpiece surfboard, comprising:

a base affixed to the surfboard, said base comprising a base plug affixed to the surfboard and a base attachment affixed to said base plug, wherein said base attachment has an orifice defined therein with a plurality of recesses defined in said orifice; and a detachable segment mechanically and detachably connected to said base and configured to separate from said base upon application of a separation force thereto;

wherein said detachable segment comprises a plurality of beams substantially evenly spaced circumferentially apart at an end thereof, each beam comprising a protrusion extending radially outward at an end of said beam, wherein each said beam is deflectable radially inward during insertion into said base attachment, and wherein each beam snaps back to its original position upon engagement with a corresponding said recess in said base attachment upon engagement with said base attachment;

wherein said detachable segment further comprises a camera stick.

7. The breakaway camera mount assembly of claim 6, wherein said detachable segment is configured to separate from said base attachment upon application of a force thereto at least equal to a separation force, and wherein said application of a force greater than said separation force to said detachable segment causes at least one said beam to deflect radially inward out of engagement with said corresponding said recess, resulting in separation of said detachable segment from said base.

\* \* \* \* \*